Figure 1:
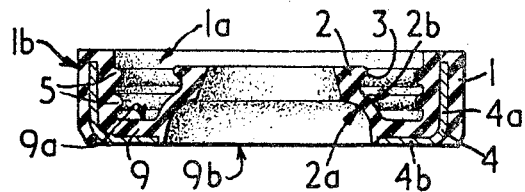

Sept. 6, 1966  E. T. JAGGER ETAL  3,270,373
APPARATUS FOR THE MANUFACTURE OF REINFORCED
SEALING OR PACKING RINGS
Original Filed March 2, 1962

United States Patent Office 3,270,373
Patented Sept. 6, 1966

3,270,373
APPARATUS FOR THE MANUFACTURE OF REINFORCED SEALING OR PACKING RINGS
Ernest Thornton Jagger and Edward Ivison Hunter, Newcastle upon Tyne, England, assignors to George Angus & Company Limited, Newcastle upon Tyne, England
Continuation of application Ser. No. 177,076, Mar. 2, 1962. This application Apr. 23, 1965, Ser. No. 450,293
Claims priority, application Great Britain, Mar. 15, 1961, 9,446/61
4 Claims. (Cl. 18—36)

This invention is a continuation of our application Serial No. 177,076 filed March 2, 1962, now abandoned, and relates primarily to an apparatus for the manufacture of reinforced sealing rings, of the kind often called oil seals, and which each consist of a ring which is of a rubber material and which fits in an annular space, such as a space between a shaft and a surrounding housing, so as to impede leakage of oil or other fluid or ingress of dirt between relatively movable mechanical parts. Such sealing rings will hereinafter be called oil seals but this is not intended to exclude sealing or packing rings used for other purposes, such as U-packing rings for pistons.

An oil seal may be held in a housing and have a sealing lip in wiping contact with a shaft, then being called an internal seal, but for some purposes a seal can be held on a shaft and have a sealing lip in wiping contact with the housing, then being called an external seal.

The term "rubber material" is intended to include not only natural rubber but synthetic polymers and co-polymers which have rubberlike properties, particularly those polymers and co-polymers which are flexible and resiliently deformable. Such rubbers are generally vulcanisable or can be chemically cross-linked during processing to change them from a plastic to an elastic state and they may be compounded with fillers and plasticisers and other compounding ingredients as is well known. The term "rubber material" also includes any suitable polymer or co-polymer which is thermoplastic and which is normally non-vulcanisable but which is flexible and resilient and such materials may also be compounded if desired and processed according to well known methods.

The sealing rings of oil seals usually are moulded each with an axially-directed recess and have an embedded reinforcement, such as a metal ring, and this entails moulding in die members comprising at least two axially separable members such as multiple-cavity male and female die members.

On separation of the male and female die members after moulding, the moulded rings tend to remain in the female die member recesses, in which they have a relatively large contact portion stiffened by the metal ring, and their extraction from the recesses entails considerably more difficulty and liability to damage than is involved in stripping moulded rings from the projections of male die members on which they are externally accessible.

The present invention has for a primary object to facilitate the production of oil seals by providing for the retention of the moulded sealing rings by a die member from which they can easily be stripped.

Another object of this invention is to provide apparatus for forming a U-section sealing ring of the class formed of flexible and resiliently-deformable rubber material and having a pair of radially-spaced axially-directed limbs, one on each side of an axially-directed recess, and a radially-extending web portion joining the limbs at one end, said sealing ring further having an L-section rigid reinforcing ring which reinforcing ring has a cylindrical axial flange embedded in and stiffening the radially-outermost limb of the pair of radially-spaced limbs and which reinforcing ring also has a radial flange reinforcing the web portion by extending from the axial flange towards the innermost limb of the pair of radially-spaced limbs, each of said pair of radially-spaced limbs having a radially-inner surface and a radially-outer surface and said web portion having axially-spaced top and bottom surfaces; said apparatus comprising a male die member and a female die member; said female die member having an outer annular wall shaping the radially-outer surface of the radially-outermost limb, said female die member further having a central spigot coaxially within the annular wall shaping said radially-inner surface of the innermost limb, said outer annular wall having a greater diameter than said cylindrical axial flange, and said female die member further having a base parallel with the radial flange and defining the bottom surface of the web portion; and said male die member having an annular axial projection extending within the female die member radially between and in radially-spaced relation to both said outer annular wall and said spigot, said annular axial projection having a radially-inner surface shaping the radially-outer surface of said radially-innermost limb, an end surface shaping said top surface of the web portion and a radially-outer surface shaping the radially-inner surface of the radially-outermost limb, said radially-outer surface of the annular axial projection being radially spaced inwards from said cylindrical axial flange and having therein circumferential grooving forming in the radially-inner surface of the radially-outermost limb corresponding circumferential beading, whereby on separation of the male and female die members after moulding of said sealing ring the grooving and the beading act as co-operating abutments between the stiffened radially-outermost limb of the sealing ring and said annular axial projection thereby ensuring stripping of sealing ring from within the female die member.

It should here be noted that the invention does not merely provide a moulded-in abutment to cause a moulded ring to be retained by the male die member from which it can easily be stripped but also provides such moulded-in abutment in a portion of the sealing ring which lies and is trapped between the die face forming the abutment and the relatively rigid axial flange of the reinforcing ring so that while the sealing ring is still within the female die member there is strong resistance to disengagement of the abutments. Once the sealing ring is clear of the female die member separation of the sealing ring from the male die member is possible because the reinforcing ring can now give sufficiently to allow disengagement of the abutments. A simple abutment on a surface of an un-reinforced limb can not be relied upon to effect retention with the appropriate die member because the flexibility of the rubber material could allow the abutment to escape, from the male die part by which it is formed, under the drag of the relatively large surface adhesion of the moulding in the recess of the female die member.

The abutment could be provided by a groove in the respective rubber surface but preferably is in the form of a circumferentially or helically extending bead, more particularly it is preferred to provide two complete circumferential beads, one axially spaced from the other.

Although the invention has been devised primarily for oil seals, and similar sealing or packing rings, the principle on which it is based, i.e. the provision of an abutment on a surface of rubber trapped between opposed parts of a die member and a relatively-rigid reinforcement embedded in the rubber, can be applied to the moulding of other recessed and reinforced rubber articles.

Figure 2:
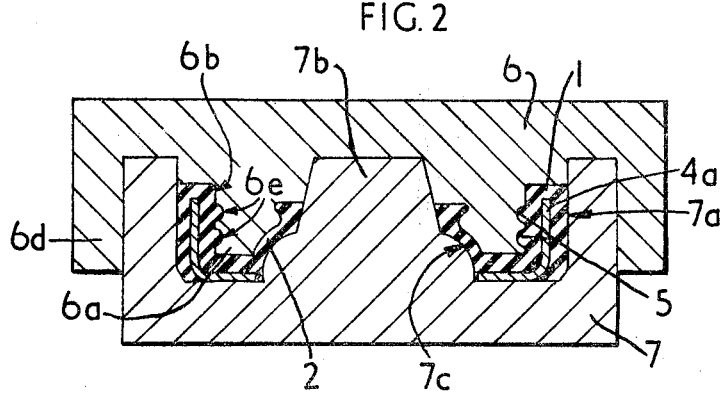
Figure 3:
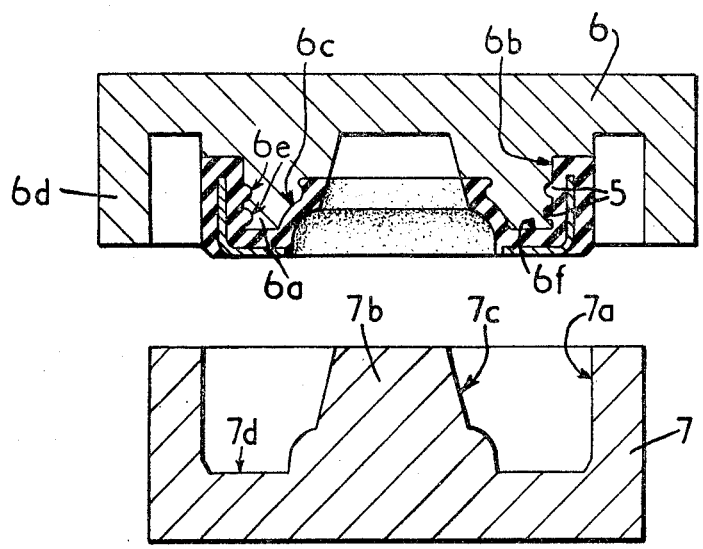

One example of an oil seal and the moulding thereof will now be described with reference to the accompanying drawing, in which:

FIG. 1 is a diametral axial section through a reinforced rubber ring to form an internal oil seal for a rotating shaft, FIG. 2 is a somewhat diagrammatic axial section of a two-part die closed in moulding the reinforced rubber ring of FIG. 1, and FIG. 3 is an axial section corresponding to FIG. 2 but showing the die members separated after moulding.

As shown by FIG. 1, the sealing ring is of U-section and annular and it has a cylindrical wall 1 forming the outermost limb which forms a holding portion by which the oil seal can be mounted in a housing, and an annulus 2 forming the innermost limb of the U-section, the inner surface $2^a$ of which limb 2 is subsequently cut or ground to form a sealing lip and the outer surface $2^b$ of which is formed with a circumferential groove 3 to seat a constricting garter spring as is well known. The limb 1 has an inner surface $1^a$ and an outer surface $1^b$. The ring also has a web portion 9 with a top surface $9^a$, and bottom surface $9^b$.

In the limb 1 is embedded a cylindrical axial flange $4^a$ of an L-section metal reinforcing ring 4, the radial flange $4^b$ of which extends in the web 9 of the rubber ring from the flange $4^a$ towards limb 2, so that the reinforced rubber ring is stiff enough to be mounted as an interference press fit in a housing whilst leaving the annulus 2 resiliently free to seal around a shaft.

The inner surface $1^a$ of the limb 1, bounding the axially-directed recess between the wall 1 and the annulus 2, has two axially-spaced, continuous circumferential beads 5 moulded in the rubber of the ring.

As can be seen from FIG. 2, the sealing ring is moulded between a male die member 6 and a female die member 7.

The female die member 7 has an outer annular wall the inner cylindrical surface $7^a$ of which shapes the surface $1^b$ of the limb 1, the diameter of this surface $7^a$ being greater than that of the flange $4^a$. The die member 7 further has a central spigot $7^b$ whereof the surface $7^c$ shapes the surface $2^a$ of the limb 2. The base of the die member 7 has a surface $7^d$ shaping the surface $9^b$ of the ring.

The male die member 6 has an annular axial projection $6^a$ whereof the outer surface $6^b$ is of less diameter than flange $4^a$ and shapes the surface $1^a$ of limb 1, and whereof the inner surface $6^a$ shapes the outer surface $2^b$ of limb 2. The end surface $6^f$ of the projection $6^a$ shapes the surface $9^a$ of the web 9. The die member 6 also has an annular flange $6^d$ which acts as a guide for the female die member 7 to maintain the die members concentric during moulding.

As can also be seen from FIG. 2, the outer surface $6^b$ of the annular projection $6^a$ has formed in it an axially-spaced pair of circumferentially continuous grooves $6^e$ which shape in the surface $1^a$ a complementary pair of circumferentially continuous beads 5. As will be described below these beads 5 and grooves $6^e$ co-act as axial abutments during stripping of the female die member 7.

The external and internal peripheral shape of the surfaces $1^b$, $9^b$ and $2^a$ are formed by the female die member 7 and it can be seen that this has a considerably greater area of contact with the moulded ring than the male die member 6, particularly with the outer limb which is stiffened by the flange $4^a$, of the metal reinforcing ring 4, which is disposed in the dies 6, 7 co-axially with the spigot $7^b$ and wall surface $7^a$.

In the previous moulding of sealing rings which do not have such beads 5, it has been found that, on separation of the die members, the moulded ring tends to remain in the female die member 7 and that extraction of the moulded ring from the female die member is much more difficult, and more likely to involve damage, than stripping of the moulded ring from the male die member 6 by a simple axial pull.

The beads 5 and the grooves $6^e$, however, co-act as axial abutments being stiffened by the axial flange $4^a$ of the metal ring 4, and cause the moulded ring to be retained by the die member 6 when the two die members are separated as shown by FIG. 3 so facilitating stripping of the female die first despite its larger contact area with the moulded ring. Once clear of the female die member 7, the wall 1 can yield resiliently enough for the moulded ring to be pulled axially from the male die member 6.

It should be noted that although the garter spring seating groove 3 provides an abutment which might be expected to promote retention of the moulded ring on the male die member 6, such retention has not occurred in the previous moulding of such rings. It is suggested that the reason for this is that the groove 3 is formed in the annulus 2, which is unstiffened and can therefore flex readily as compared with the rubber forming the recess-surface of the stiffened wall 1.

Although the invention has been described and illustrated as applied to an oil seal, it will be appreciated that it could be applied to the moulding of other recessed rubber articles having embedded rigid reinforcements.

We claim:

1. An apparatus for forming an annular U-section sealing ring of flexible and resiliently deformable material comprising: a female die having a central spigot, an annular flange, and a bottom, said spigot, flange and bottom forming sides of an annular U-section space in said female die; a male die having a bottom and an annular U-section projection extending outwardly from said bottom, the dimensions of the U-section of the male die being smaller than the dimensions of the annular U-section space of the female die; said male die being designed to mate with the female die to form an annular U-shaped cavity having an inner limb, a bottom, and an outer limb, the said projection forming the inside of the U of the cavity and the said sides of the space forming the outside of the U-section cavity; and said male die having at least one circumferential groove on the outer side of its annular projection, said groove being positioned on the inner side of the outer limb of the cavity which is formed when the male member is mated with the female member.

2. An apparatus as claimed in claim 1 wherein the axis of the said annular projection is substantially coincident with the axis of the said annular space, the said cavity is adapted to receive an annular reinforcing ring in the outer limb thereof, and the said circumferential groove is positioned adjacent the portion of the outer limb which is adapted to receive the annular reinforcing ring.

3. An apparatus as claimed in claim 1 wherein said male die has two circumferential grooves on the outer side of its annular projection.

4. An apparatus as claimed in claim 1 wherein the outer limb of the U-section cavity is substantially perpendicular to the bottom of the U-section cavity, the said cavity is adapted to receive an annular L-section reinforcing ring, one leg of the L being positionable in the outer limb and the other arm of the L being positionable in the bottom of the annular U-section cavity, and the said circumferential groove is positioned adjacent the portion of the outer limb which is adapted to receive an arm of the L-section reinforcing ring.

References Cited by the Examiner

UNITED STATES PATENTS

| | | | |
|---|---|---|---|
| Re 19,000 | 11/1933 | Scribner | 18—2 |
| 2,249,141 | 7/1941 | Johnson | 288—3 |
| 2,408,629 | 10/1946 | Green. | |
| 2,950,506 | 8/1960 | Corsi | 18—36 X |
| 3,162,456 | 12/1964 | Williams | 18—36 XR |

ROBERT F. WHITE, *Primary Examiner.*

L. S. SQUIRES, *Assistant Examiner.*